Patented Nov. 27, 1951

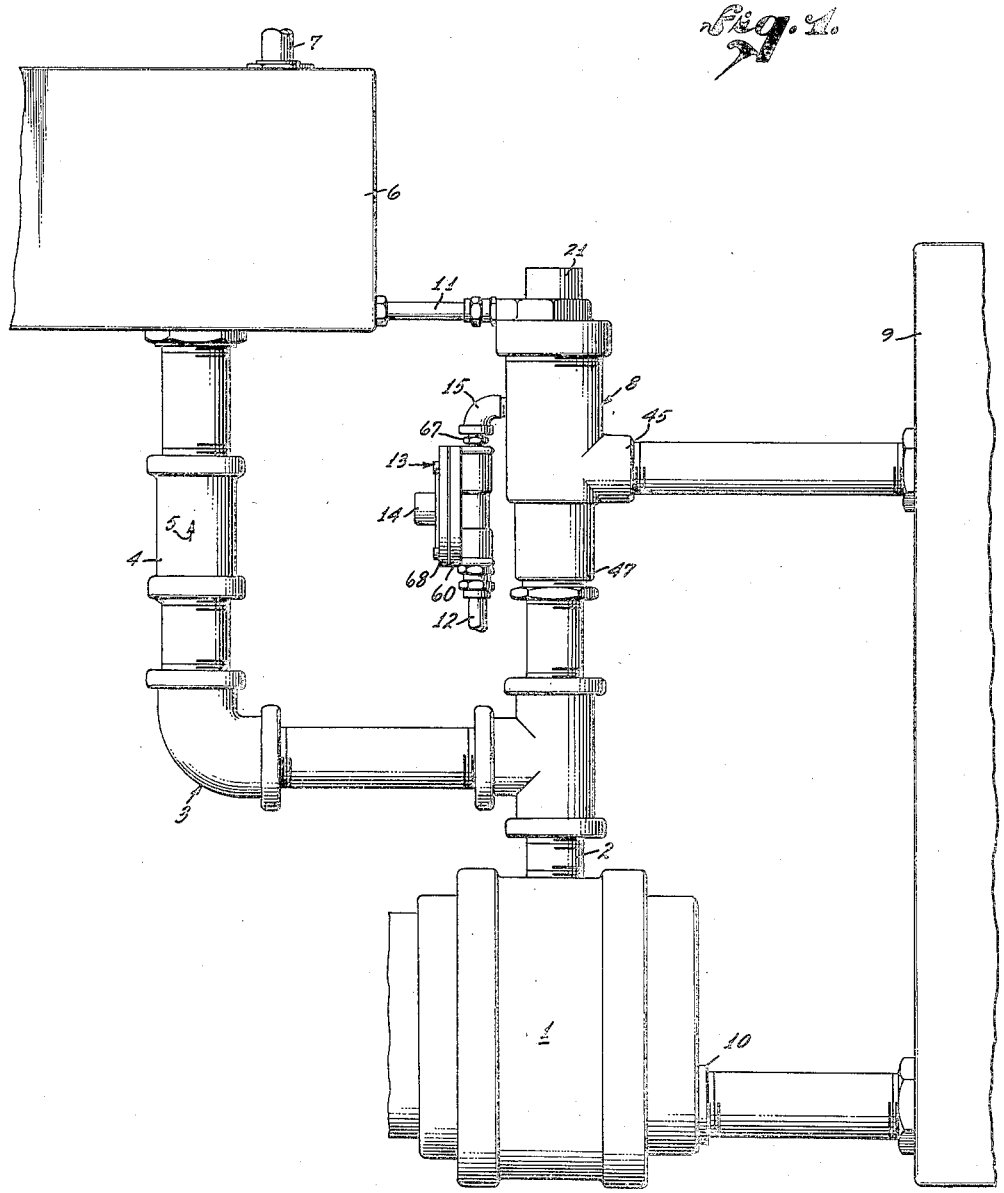

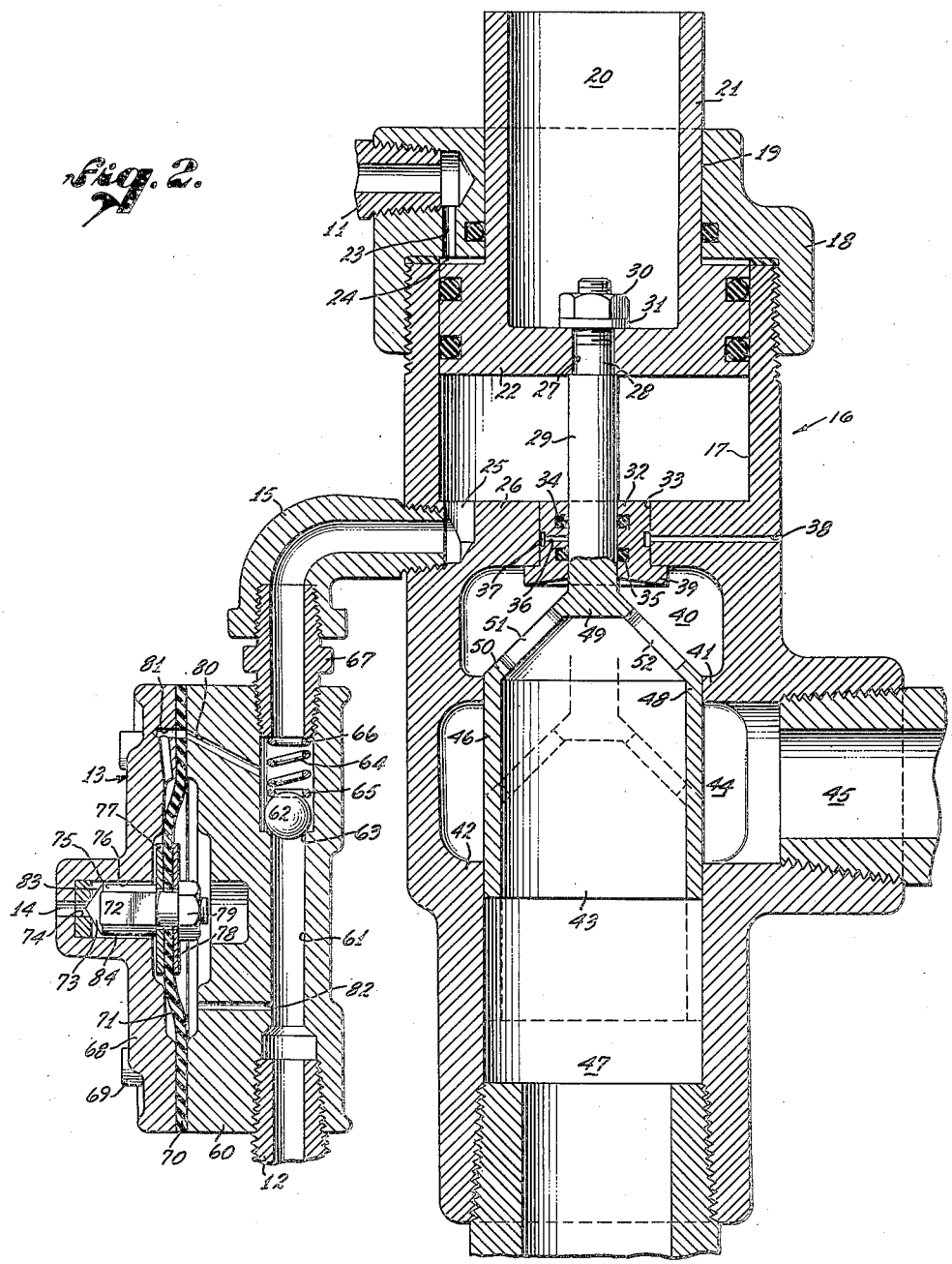

2,576,541

UNITED STATES PATENT OFFICE 2,576,541

BACK-PRESSURE RELIEF VALVE

William H. Schmitt, Rialto, Calif., assignor to The Rialto Corporation, Rialto, Calif., a corporation of California Application May 22, 1948, Serial No. 28,632

7 Claims. (Cl. 137—53)

The invention relates to a back pressure relief valve.

An object of the invention is to provide a relief valve which permits flow of fluid pressure such as air pressure in one direction, while checking reverse flow due to back pressure, and while exhausting to the atmosphere or the like all excess back pressure above the inlet pressure, to the end that substantially constant pressure is maintained in the delivery outlet of the valve regardless of whether pressure is flowing from its inlet to its outlet or whether flow in the reverse direction is stopped by the check valve.

While there are various other situations under which it is desirable to relieve back pressure which exceeds a given amount, a particular use for the back pressure relief valve of this invention is disclosed herein and in co-pending application S. N. 27,692, filed May 18, 1948, for Pressure Regulator. The pressure regulator disclosed in the present case and its combination with the back pressure relief valve are claimed in said co-pending application, the claims in the instant case being directed to the back pressure relief valve itself as it is of use in situations other than its use with the particular pressure regulator disclosed herein.

As explained in more detail later, the purpose of relieving the back pressure when it exceeds the value of inlet pressure is to avoid interference with the use of the inlet pressure as one of the controlling elements in determining the operation of the pressure regulator, the other controlling element being the tank pressure to be controlled. The pressure regulator valve takes a position to deliver liquid pressure to the tank or to a by-pass, depending upon whether the regulated air supply is greater or less than the tank pressure, the force of these two pressures being arranged in opposition to operate a differential piston which operates the pressure regulator valve. When the differential piston moves in the direction in which the check valve seats, back pressure is built up, but only to the small extent necessary to operate the relief valve of the present invention. The tank pressure is regulated by means of a regulator valve movable to one position to by-pass the pump whereby it operates under practically no load, or to another position to close the by-pass and cause the pump to deliver fluid under pressure to the tank. The regulator by-pass valve is operated in accordance with the tank pressure. The advantage of this by-pass system is that the motor which drives the pump may be left in constant operation, the pump operating under load or no load, as required.

The usual spring operated pressure regulator valve has a tendency to chatter as the pump has to work against the pressure of the spring. The disadvantage of employing a spring on the regulator is overcome by operating the by-pass regulator valve by a differential fluid pressure, namely, by the difference between a constant regulated air pressure and the tank pressure. Such an arrangement still has the disadvantage, in common with other types of regulator valves, of causing the fluid passing through the valve to heat up at times when the valve is in a partially open position, as the work of forcing the fluid through the valve is converted into heat at the restricted valve opening. A principal object of the present invention is to overcome this heating, and this is accomplished by giving the valve only two operative positions, namely, a fully open position or a fully closed position, and by causing the valve to quickly move from one position to the other with a snap action.

The constant regulated air pressure which is one of the controlling factors in operating the by-pass valve, has a check valve to prevent reverse flow. When the differential piston, which actuates the valve, moves in the direction in which the check valve seats, back pressure is built up, whereas such pressure should remain constant. To prevent such back pressure from hindering the snap action of the by-pass valve, the invention provides means for relieving such back pressure when it exceeds the value of the constant regulated supply.

For further details of the invention, reference may be made to the drawings wherein Fig. 1 is a schematic diagram of a pressure regulator having a back pressure relief valve according to the present invention.

Fig. 2 is an enlarged vertical sectional view of the relief valve and pressure regulator of Fig. 1.

Referring in detail to the drawings, the fluid pump 1 is driven by a motor not shown. The outlet 2 of pump 1 is delivered through suitable pipe connections 3 and a check valve 4 which opens in the direction indicated by the arrow 5, to a storage tank 6 from which liquid under pressure is supplied by outlet 7 to one or more hydraulic cylinders not shown, or the outlet of pump 1 may be delivered through a by-pass regulator valve 8 to a tank 9 from which fluid is supplied to the inlet 10 of the pump.

As shown in Fig. 2, the pressure in tank 6 is supplied to the regulator valve 8 by a pipe connection 11. Air at constant pressure is fed to the line 12, the pressure being regulated by the usual pressure regulator not shown. The air pressure in line 12 passes through relief valve 13 and is fed by a suitable connection 15 to the regulator valve 8.

As shown in Fig. 2, regulator 8 has a valve casing 16 at the upper end of which is a large cylinder 17 closed by a cap 18 having a smaller cylinder 19. The differential piston 20 has a sleeve 21 which slidingly fits in cylinder 19 and a larger head 22 which slidingly fits in the cylinder 17. The tank pressure from conduit 11 is admitted through passage 23 in the cap 18 to the annular area 24 which has an area equal to the difference between the areas of the piston head 22 and sleeve 21, while the constant regulated air pressure is delivered by a conduit 15 through a passage 25 in the wall 26 to the end of piston 22. The ratio of the area of piston 22 to the annular area 24 in the example illustrated is two and one-half to one, although other values may be used. The usual shop has a source of air pressure of about 70 to 125 pounds p. s. i. which may have a conventional pressure regulator and check valve and supplied at constant pressure to the connection 12 although other pressure may be used. At any rate, the pressure in tank 6 will be regulated at a value which is greater than the pressure in line 12, by two and one-half times in the example illustrated or by whatever the differential piston ratio may be.

Piston head 22 has an axial bore 27 to receive the threaded end 28 of a piston rod 29 secured to head 22 by a nut 30 and washer 31. Rod 29 slidingly fits in a bearing 32 force fitted in a bore 33 in the wall 26. Bearing 32 has an upper ring seal 34 and a lower ring seal 35. Between ring seals 34 and 35 is a radial bleed passage 36 communicating with a peripheral passage 37, the latter communicating with a passage 39 through the casing 16 and opening to atmosphere. Air which leaks downwardly past the ring seal 34 and fluid which leaks upwardly through ring seal 35 around rod 29 both bleed to atmosphere through passageway 38. Bearing 32 has an enlarged head 39 which bears against the underside of wall 26.

Wall 26 separates cylinder 17 from upper valve chamber 40. Chamber 40 at the bottom thereof has an annular ring seat 41 and spaced therefrom is a companion cylindrical seat 42 for a sleeve valve head 43. Between seats 41 and 42 is an enlarged valve chamber 44 which communicates with an outlet 45 leading to tank 9.

Valve 43 has an imperforate cylindrical portion 46 of a length sufficient to bridge the space between seats 41 and 42 and shut off flow to the outlet 45 when valve 43 is in the full line position shown in Fig. 2. Valve 43 is a sleeve valve and fluid from the inlet 47 is admitted to the interior of valve 43 at all times. The inlet 47 is an extension of seat 42.

Valve 43 at its upper end 48 is connected to the lower end 49 of rod 29 by an upwardly converging conical portion 50, serving as a spider and having a plurality of ports indicated at 51 and 52.

The upper valve chamber 40 has no lateral outlet and when valve 43 is in the full line position shown in Fig. 2, the full pump pressure is admitted through ports 51 and 52 to chamber 40. Such pressure is balanced on rod 29 except for the unbalanced pressure on the end 49 for the area of rod 29 in bearing 32 and such unbalanced pressure is employed to give the valve 43 a snap action as follows:

When valve 43 is closed as shown in Fig. 2, this represents the condition existing with air pressure in cylinder 17 greater than two and one-half times the tank pressure acting on annular piston 24 and the pump at this time is not by-passing but is building up pressure in tank 6. Valve 43 will start to open and permit fluid in inlet 47 to pass through ports 51 and 52 into outlet 45 when the tank pressure acting on annular area 24 is greater than the friction of the parts plus (1) the constant pressure acting on piston head 22, and (2) the pump pressure acting on the unbalanced end 49 of the piston rod. As soon as the tank pressure exceeds those opposing forces, valve 43 starts to descend and open and as soon as it initially opens, the pump starts to by-pass and the pressure on the unbalanced end 49 of the piston rod is thereby reduced, such reduction increasing the effectiveness of the force tending to open the valve whereby it accelerates and quickly moves to fully open position shown in dotted lines. On the other hand, valve 43 will start to close when the force acting on piston 22 exceeds the tank pressure acting on the smaller piston 24, the force acting on the unbalanced rod end 49 being negligible at the start, with valve 43 fully open. As soon as valve 43 moves towards closed position, pressure builds up inside of valve 43 and on the rod end 49 and this gives an auxiliary force which causes valve 43 to accelerate and quickly reach closed position with a snap action.

The area of ports 51 and 52 is large enough to cause no appreciable restriction of the flow when valve 43 is open. Valve 43 has only two operating positions, namely, either a fully open position or a fully closed position, thereby avoiding a restricted partially open position and its consequent heating of the fluid passing through valve 43.

Relief valve 13 comprises a base 60 having a through passage 61 having a spring pressed check valve 62. Valve 62 is shown as a ball held to its seat 63 by a suitable spring 64 having a flat turn 65 on the ball 62 and a flat turn 66 on the end of a coupling 67 connected with the elbow 15. Base 60 has a cap 68 held in position by a number of bolts indicated at 69. Serving as a gasket for cap 68 is the periphery 70 of a flexible diaphragm 71 of neoprene or the like. Diaphragm 71 has a valve 72 having a conical head 73 for a seat 74 which opens into the outlet 14. Valve 72 has a cylindrical shank 75 which slidingly fits in the bore 76 in the cap. Shank 72 has flat sides 83, 84 for passage of air. Valve 72 is suitably secured to diaphragm 71 by washers 77 and 78 and a nut 79. Behind check valve 62, base 60 has a passage 80 extending through diaphragm 70 and through cap 68 as indicated at 81, to the outer side of diaphragm 71. On the other side of check valve 62, base 60 has a passage 82 communicating with the inner side of diaphragm 71.

Check valve 62 remains closed as long as the regulated air supply from connection 12 is equal to or less than the pressure in cylinder 17, which occurs for example, when piston head 22 ascends or is stationary. When piston head 22 descends and moves in the direction in which check valve 62 seats, back pressure builds up behind check valve 62 in cylinder 17 and the connections 15 and 67 communicating with it. When such back pressure exceeds the pressure in inlet 12, valve 72 opens to discharge such excess to atmosphere through outlet 14. When such back pressure drops sufficiently, the pressure in passage 82 causes valve 72 to close as the pressure ahead of check valve 62 builds up until it reaches a point where it will overcome the spring 64. Spring 64 is comparatively weak and just sufficient to hold the ball check valve 62 on its seat, valve 62 unseating at about 1 pound p. s. i.

Diaphragm 71 is not stretched tight but instead its central active portion is loose or flabby whereby diaphragm 71 does not provide any force to restore relief valve 72 to one position or another, whereby valve 72 is inert and remains in its actuated position either open or closed until a fluid pressure on one side of the diaphragm 71 or the other actuates it to its alternate position. The ratio of the area of diaphragm 71 to the area of seat 14 is at least 50 to 1 and preferably 135 to 1, which means that if there is a pressure of 135 pounds acting on both sides of diaphragm 71, there is a fluid pressure of 1 pound acting to hold valve 72 on its seat, the fluid pressure acting on valve 72 being unbalanced over the area of seat 14. However, when back pressure begins to build up, check valve 62 being closed, only a small increase in such back pressure will operate valve 72 as this back pressure acts on the large area of the diaphragm 71. The air pressure in inlet 12 may be from 40 to 125 pounds with an average of 90 pounds p. s. i., although other values can be used.

The back pressure relief valve 13 thus prevents back pressure in cylinder 17 from hindering the snap action of the by-pass regulator valve 43.

The relief valve and pressure regulator, as shown in Figs. 1 and 2 and above described, have been constructed and tested and found to operate as above described.

While the relief valve 13 is shown as suspended from elbow 15 with through passage 61 vertical, whereby the weight of valve 72 has no influence on its closing, it is not necessary that valve 13 be mounted in this position. It has also been used with passage 62 horizontal and valve 72 vertical and below it whereby the weight of valve 72 assists in closing it. Relief valve 13 works equally well in various positions.

Fig. 2 shows full scale the relief valve and pressure regulator which have been tested as above described. Other diameters, larger or smaller, for piston rod 29, without changing the size of valve 43 may be used and will have a direct effect on the differential of the pressure regulated. As the rod 29 increases in diameter, the wider is the range between opening and closing. This fact will hold true theoretically as a proportional relationship but the diameter shown in Fig. 2 gives the most desirable differential. This equals 30 pounds p. s. i. at 180 pounds shut-off pressure. In other words, the pressure drops from 180 pounds p. s. i. to 150 pounds p. s. i. to start up. Now, if one increases the diameter of rod 29 one-eighth in diameter, it results in approximately 40 pounds differential.

The check valve 62 and relief valve 72 are operative to maintain substantially constant pressure conditions in elbow 15 and cylinder 17 regardless of whether constant fluid pressure is flowing from inlet 12 to elbow 15 or whether back pressure is flowing in the reverse direction through elbow 15 and outlet 14. Elbow 15 and coupling 67 therefore serve as a combined outlet from inlet 12 for normal flow and inlet for back pressure flow.

It will be apparent that various modifications may be made in the invention without departing from the spirit of the following claims. For example, the value of the regulated pressure in tank 6 may be readily changed by changing the setting of the pressure regulator not shown, for the constant pressure air inlet 12. Also the pressure to be regulated may have a value lower, by the differential ratio, than the constant pressure in inlet 12, by reversing the connections 11 and 15 to the piston, whereby the constant air pressure acts on the smaller piston area, while the pressure to be regulated acts on the larger piston area. Also the valve 43 may move upwardly to open position instead of to closed position.

The ratio between the combined areas of the ports like 51, 52 to the area of outlet 45 is not critical, but a ratio of one-to-one is preferred. The amount which diaphragm 71 bulges may be varied but in any event it bulges out of the plane of its annular clamping members provided by base 60 and cap 68 so that diaphragm 71 is not stretched when relief valve 72 operates. When valve 72 is fully open, diaphragm 71 bulges inwardly and rests on the stepped recess at the top of base 60.

I claim:

1. A valve device comprising a casing having an inlet and having an outlet subject to back pressure, a differential fluid pressure operated relief valve having a diaphragm, one side of said diaphragm having one passage in said casing communicating with said inlet and the other side of said diaphragm having another passage communicating with said outlet, said relief valve having an exhaust passage communicating with said back pressure outlet, said relief valve having a valve member cooperating with said diaphragm and controlling said exhaust passage, said diaphragm being responsive to an excess in said back pressure over said inlet pressure to operate said valve member and relieve the back pressure, and a check valve for checking reverse flow from said outlet to said inlet while leaving said other passage in communication with said outlet during back pressure by said relief valve member.

2. A back pressure relief valve comprising a casing having a through passage, said passage having an inlet and having a combined outlet for normal flow and inlet for back pressure, a check valve in said passage, said casing having an exhaust passage communicating with said back pressure inlet, said relief valve having a valve member on said diaphragm and a cooperating seat, said valve member controlling said exhaust passage, a relief valve having a diaphragm, a passage from said first mentioned inlet at the inlet side of said check valve to that side of said diaphragm tending to close said valve member to its said seat, and a passage from said combined outlet and back pressure inlet at the other side of said check valve to the other side of said diaphragm.

3. A back pressure relief valve according to claim 2 comprising a comparatively weak spring tending to seat said check valve, the ratio of the area of said diaphragm to the area of said seat being at least 50 to 1, said diaphragm having a flabby inert portion supporting said valve member and exerting substantially no restoring force thereon.

4. A fluid pressure operated valve comprising a flabby unstretched diaphragm of rubber like material, superposed annular members clamping the margin of said diaphragm with the inner unclamped portion of said diaphragm loosely bulging out of the plane of said clamping members in a flabby condition having substantially no restoring force, a valve head on said diaphragm and a cooperating seat, and fluid pressure means for operating said diaphragm to reciprocate said valve head, the opening and closing movements of said valve head being insufficient to stretch said diaphragm whereby said diaphragm offers substantially no restoring force for said valve head.

5. Valve means comprising a back pressure relief valve having a seat and valve head having an inert diaphragm exerting substantially no restoring force on said relief valve, an exhaust controlled by said valve, a supply passage having a check valve, said exhaust communicating with the supply discharge side of said check valve, passages from opposite sides of said check valve to opposite sides of said diaphragm respectively, a weak spring tending to seat said check valve for back pressure flow, the parts being so constructed and arranged that (1) pressure in building up in said passage to unseat said check valve acts through one of said passages on said diaphragm to close said relief valve, (2) said check valve in opening admits said pressure to the other of said passages but said relief valve does not open at this time as the unseating pressure acts on an area less than the seating pressure by an amount equal to the area of said relief valve seat, and (3) back pressure seats said check valve and acts on said diaphragm to unseat said relief valve and open said exhaust.

6. Valve means comprising a constant fluid pressure inlet, a combined outlet therefor and inlet for back pressure, means preventing reverse flow from said back pressure inlet to said first inlet, a relief valve, an exhaust for said back pressure inlet controlled by said valve, and fluid pressure operated means differentially responsive to pressure in said first inlet and in said combined outlet and back pressure inlet for operating said valve.

7. A valve device comprising an inlet, an outlet subject to back pressure, a relief valve comprising a diaphragm of flabby unstretched material having substantially no restoring force, a valve head on said diaphragm at one side thereof, a seat for said valve head, said seat having an exhaust passage controlled by said valve head, a passage connecting said valve head side of said diaphragm to said outlet, a passage connecting the other side of said diaphragm to said inlet, a check valve in the path of flow from said inlet to said outlet, a spring for said check valve, said check valve closing for reverse flow from said outlet to said inlet, said diaphragm passage for the valve head side of said diaphragm communicating with said outlet at the outlet side of said check valve and said diaphragm passage for said other side of said diaphragm communicating with said inlet at the inlet side of said check valve, said check valve under action of said spring remaining closed for a low value of pressure in said inlet, said other side of said diaphragm being responsive to said low value of inlet pressure to close said relief valve and thereby reduce the effective area of the valve head side of said diaphragm by the area of its said seat, said check valve being responsive to larger values of pressure in said inlet to open and admit flow to said outlet and to the valve head side of said diaphragm, said diaphragm being unresponsive to flow from said inlet to said outlet with said check valve open, said valve head side of said diaphragm being responsive to back pressure in said outlet, with said check valve closed, to open said relief valve and exhaust said back pressure in said outlet through said exhaust passage.

WILLIAM H. SCHMITT.

REFERENCES CITED

The following references are of record in the file of this patent:

UNITED STATES PATENTS

| Number | Name | Date |
|---|---|---|
| 556,704 | Stevens | Mar. 17, 1896 |
| 688,306 | Hardie | Dec. 10, 1901 |
| 1,148,568 | Bees | Aug. 3, 1915 |
| 1,185,333 | Keltner | May 30, 1916 |
| 1,270,961 | Lippert | July 2, 1918 |
| 1,554,683 | Mount | Sept. 22, 1925 |
| 1,650,150 | Nelson | Nov. 22, 1927 |
| 2,304,991 | Foster | Dec. 15, 1942 |
| 2,367,682 | Kehle | Jan. 23, 1945 |
| 2,394,911 | Griswold | Feb. 12, 1946 |